(12) United States Patent
Saito et al.

(10) Patent No.: US 8,474,964 B2
(45) Date of Patent: Jul. 2, 2013

(54) INK, INK-JET RECORDING METHOD, AND INK CARTRIDGE

(75) Inventors: Takashi Saito, Yokohama (JP); Fumiaki Fujioka, Kawasaki (JP); Hiromitsu Kishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

(21) Appl. No.: 13/008,664

(22) Filed: Jan. 18, 2011

(65) Prior Publication Data

US 2011/0175964 A1 Jul. 21, 2011

(30) Foreign Application Priority Data

Jan. 20, 2010 (JP) ................................. 2010-009598

(51) Int. Cl.
*C09D 11/02* (2006.01)
*B41J 2/17* (2006.01)
(52) U.S. Cl.
USPC ............................ 347/100; 106/31.6; 523/160
(58) Field of Classification Search
None
See application file for complete search history.

(56) References Cited

U.S. PATENT DOCUMENTS

| | | | |
|---|---|---|---|
| 6,150,433 A | 11/2000 | Tsang | |
| 6,221,932 B1 | 4/2001 | Moffatt | |
| 6,454,403 B1 | 9/2002 | Takada | |
| 2004/0229976 A1 | 11/2004 | Kakiuchi | |
| 2008/0177003 A1 | 7/2008 | Lee | |

FOREIGN PATENT DOCUMENTS

| | | |
|---|---|---|
| CN | 101240132 A | 8/2008 |
| EP | 976799 A1 | 2/2000 |
| EP | 1961795 A1 | 8/2008 |
| JP | 2000-095987 A | 4/2000 |
| JP | 2002-097390 A | 4/2002 |
| JP | 2002-097390 A | 4/2002 |
| JP | 2004-285344 A | 10/2004 |
| JP | 2010-516860 T | 5/2010 |

OTHER PUBLICATIONS

XP002631177, C:\EPOPROGS\SEA\.\..\..\epodatalsealeplogfl internal. log.

*Primary Examiner* — Jerry Rahll
(74) *Attorney, Agent, or Firm* — Canon U.S.A., Inc., IP Division

(57) ABSTRACT

An ink containing a plurality of polymers and carbon black, wherein the plurality of polymers include a polymer A having an acid value of 200 mgKOH/g or more and 300 mgKOH/g or less and a polymer B having an acid value of 80 mgKOH/g or more and 180 mgKOH/g or less, the weight average molecular weight of the polymer A is larger than the weight average molecular weight of the polymer B, the carbon black has a DBP oil absorption of 75 mL/100 g or less and a specific surface area of 200 m$^2$/g or more, and each of -Ph-$(CH_2)_n$—$NH_2$ and -Ph-$(CH_2)_n$—NH—R serving as a functional group is bonded to surfaces of the carbon black particles, wherein in these formulae, Ph represents a phenylene group, n represents an integer of 0 to 2, and R represents the polymer A.

8 Claims, No Drawings

INK, INK-JET RECORDING METHOD, AND INK CARTRIDGE

BACKGROUND OF THE INVENTION

1. Field of the Invention

The present invention relates to an ink, an ink-jet recording method, and an ink cartridge, which can be used for ink-jet favorably.

2. Description of the Related Art

In the case where recording is performed on the surface of a recording medium with an ink-jet ink containing a pigment, a state in which much of the pigment and a polymer used as a dispersing agent are present on the surface of the recording medium is brought about depending on the recording medium used. Consequently, there is a problem in that degradation in glossiness of an image occurs easily. For example, regarding a swelling type recording medium, which is one type of recording media frequently used for an ink-jet recording method, no pore is present in an ink-receiving layer. Regarding a void type recording medium, pores are present in the ink-receiving layer, although the average particle diameter of a pigment particle is larger than the pore diameter. Consequently, most of the applied pigment particles do not permeate into the ink-receiving layer of the recording medium and is present on the surface of the recording medium through deposition. As a result, an image formed by an ink comes into the state, in which a new surface has been formed by the pigment deposited on the surface of the recording medium. Furthermore, in the case where the ink containing the polymer is applied to the recording medium and, thereafter, the concentration of the polymer relatively increases through evaporation of water and the like, agglomeration of the polymer proceeds, so that more polymers remain on the surface of the recording medium. Degradation in smoothness of the image surface and degradation in glossiness of the image may occur depending on the state of the pigment and the polymer present on the surface of the recording medium through deposition, the state being brought about as described above.

In consideration of the above-described issues, there is a proposal in which carbon black particles having a low level of structure are used as coloring materials for a black ink, the carbon black is deposited on the surface of the recording medium relatively smoothly and, thereby, the glossiness of the image is improved (refer to Japanese Patent Laid-Open No. 2002-097390). However, the carbon black particles having the low level of structure, that is, exhibiting a small DBP oil absorption, have very small particle diameters. Consequently, there is another problem in that it is difficult to disperse into an aqueous medium stably and the storage stability of the ink is insufficient. In consideration of this issue, there is a proposal in which an urethane polymer having a low acid value is further contained in the ink, so that the storage stability of the ink is improved and, in addition, the water resistance of the resulting image is improved (refer to Japanese Patent Laid-Open No. 2004-285344). Moreover, there is a proposal in which at least one of a polymer and a water-soluble functional group is bonded to the surface of carbon black particle (refer to PCT Japanese Translation Patent Publication No. 2010-516860 and Japanese Patent Laid-Open No. 2000-095987).

SUMMARY OF THE INVENTION

Aspects of the present invention provide an ink having excellent glossiness and water resistance of an image in combination and satisfying the water resistance of the ink sufficiently. Aspects of the present invention provide an ink-jet recording method capable of forming an image having excellent glossiness and water resistance in combination and an ink cartridge by using the above-described excellent ink.

Aspects of the present invention provide an ink containing a plurality of polymers and carbon black, wherein the above-described plurality of polymers include a polymer A having an acid value of 200 mgKOH/g or more and 300 mgKOH/g or less and a polymer B having an acid value of 80 mgKOH/g or more and 180 mgKOH/g or less, the weight average molecular weight of the above-described polymer A is larger than the weight average molecular weight of the above-described polymer B, the above-described carbon black has a DBP oil absorption of 75 ml/100 g or less and a specific surface area of 200 m$^2$/g or more and each of -Ph-(CH$_2$)$_n$—NH$_2$ and -Ph-(CH$_2$)$_n$—NH—R serving as a functional group is bonded to surfaces of carbon black particles, wherein in these formulae, Ph represents a phenylene group, n represents an integer of 0 to 2, and R represents the above-described polymer A.

According to aspects of the present invention, an ink having excellent glossiness and water resistance of an image in combination and satisfying the water resistance of the ink sufficiently can be provided. According to aspects of the present invention, an ink-jet recording method capable of forming an image having excellent glossiness and water resistance in combination and an ink cartridge are provided by using the above-described excellent ink.

Further features of the present invention will become apparent from the following description of exemplary embodiments.

DESCRIPTION OF THE EMBODIMENTS

Aspects of the present invention will be described below in detail with reference to embodiments. One aspect of the present invention is that an ink is configured to contain specific carbon black having a modified surface, as described later, and a plurality of polymers having specified acid values and relation of average molecular weights and, thereby, the following effects are obtained. In the case where the ink has such a configuration, in image forming, it is possible to bond between carbon black particles on the surface of a recording medium with the polymers through the use of an ionic interaction. Consequently, the water resistance of an image can be improved significantly as compared with an image formed by using the ink of the related art. That is, aspects of the present invention are different from the concept, in which the water resistance of the image is improved through the use of the film-forming property of a polymer, of the related art and has been made on the basis of a new idea that the ionic interaction between the carbon black particle surfaces and the polymers has been noted.

According to the examination of the present inventors, even when the inventions described in Japanese Patent Laid-Open No. 2002-097390 or Japanese Patent Laid-Open No. 2004-285344 are applied, there are various problems as described below. Initially, in the case where the carbon black particles exhibiting a small DBP oil absorption are used, there is a problem in that the storage stability of the ink is insufficient. Regarding the water resistance of the resulting image, it is disclosed that the performance is the same regardless of the presence or absence of the urethane polymer. Therefore, it is indicated that in the inventions described in Japanese Patent Laid-Open No. 2002-097390 and Japanese Patent Laid-Open No. 2004-285344, the urethane polymer in the ink does not exerts an influence on an improvement of the water resistance of the image. Furthermore, the water resistance of the resulting image is not noted in PCT Japanese Translation Patent Publication No. 2010-516860 and Japanese Patent Laid-Open No. 2000-095987. That is, the image resulting from any one of the above-described related art does not have the high level of glossiness and water resistance in combination, which have been required in recent years, nor satisfy the storage stability sufficiently.

Here, developments leading up to the present invention will be described. The present inventors believed that smooth deposition of carbon black particles on the surface of a recording medium was important in improving the glossiness of an image, noted the degree of fusion between particles and particle diameters, and performed examination. As a result, it was concluded that among many types of carbon black, the carbon black having a DBP oil absorption of 75 mL/100 g or less and a specific surface area of 200 m²/g or more is effective for improving the glossiness of an image because the degree of fusion between particles was low and the particle diameters were small.

Then, the glossiness and the water resistance of an image and the storage stability of the ink were evaluated by using the ink containing the carbon black having the above-described characteristics. As a result, the image recorded with this ink exhibited high glossiness, but it was not said that the water resistance of the image and the storage stability of the ink were at sufficient levels. In order to investigate the cause of the above-described results, the present inventors performed further detailed examination. Consequently, the following was made clear. According to the observation of the image recorded by using the above-described ink, carbon black particles were deposited on the surface of the recording medium smoothly. Therefore, it was believed that the glossiness of the image was improved because the image surface became smooth, as expected originally. However, as a result of further detailed observation of the image, it was made clear that not so much polymer was present between deposited carbon black particles. This indicates that in the case where the above-described carbon black having a low level of fusion between particles and a small particle diameter is contained in the ink, the glossiness of the image can be improved, but a polymer dispersing agent is not easily adsorbed by carbon black particles because the particle diameters are small. It is believed that regarding the ink containing the carbon black particles having the above-described characteristics, the water resistance of the image and the storage stability of the ink did not reach the sufficient levels for the above-described reason. That is, it is believed that in the ink, the amount of the polymer dispersing agent adsorbed by the carbon black particles was not sufficient, the dispersion stability of the carbon black was low, and the storage stability of the ink was not obtained. Furthermore, it is believed that since the amount of polymer dispersing agent adsorbed by the carbon black particles was small, the amount of polymer present between the carbon black particles was small on the surface of the recording medium and, thereby, the water resistance of the image was low.

The present inventors performed further examination to solve the two problems, that is, degradation in water resistance of the image and degradation in storage stability of the ink, which occurred in the case where the carbon black having the above-described characteristics and being capable of providing an image exhibiting high glossiness was used as a coloring material for the ink. Initially, in order to improve the dispersion stability, examination was performed on a dispersion system of the carbon black. As a result, it was found that a sufficient amount of polymer was adsorbed by the carbon black particles, the dispersion stability was improved, and excellent storage stability of the ink was exhibited by employing a dispersion form in which a part of polymer was bonded to surface of the carbon black particle rather than employing physical adsorption of a polymer dispersing agent. However, in the case where the water resistance of the image and the storage stability of the ink were evaluated by using an ink containing the above-described carbon black, the water resistance of the image was hardly improved, although the storage stability of the ink was improved. The present inventors estimate the reason for this as described below. When the image recorded by using the above-described ink was observed, it was ascertained that the polymer was present to some extent between carbon black particles deposited on the surface of the recording medium because the polymer was bonded to the carbon black. However, it is necessary to use a polymer having a relatively high acid value of 200 mgKOH/g or more for bonding to carbon black particles. Consequently, it is believed that regarding the above-described configuration, it was possible to fill between the carbon black particles with the polymer, but the acid value of the polymer was high and, therefore, the polymer was easily redissolved when the image came into contact with water and an improvement of the water resistance of the image was not facilitated because of this.

For the purpose of ensuring the compatibility between the storage stability of the ink and the water resistance of the image at a high level, the present inventors performed examination from various viewpoints, e.g., types of polymers and the relationship between the polymer and the carbon black. As a result, it was concluded that the compatibility between the above-described performances was able to be ensured by the ink configuration containing the above-described specific carbon black and a plurality of anionic polymers (the polymer contained in the structure of the functional group described later is assumed to be a polymer A, and the polymer added is assumed to be a polymer B), according to aspects of the present invention. Initially, the carbon black used in aspects of the present invention is in the form in which two types of functional groups, that is, an amino group having a specific structure and a functional group including the polymer A in the structure, are bonded to the surface of the carbon black particle. Specifically, in the carbon black used, each of -Ph-$(CH_2)_n$—$NH_2$ and -Ph-$(CH_2)_n$—NH—R (in these formulae, Ph represents a phenylene group, n represents an integer of 0 to 2, and R represents the polymer A) serving as a functional group is bonded to the surface of carbon black particle. Furthermore, the ink according to aspects of the present invention has a configuration satisfying the relationship that the acid value and the weight average molecular weight of the polymer A are larger than the acid value and the weight average molecular weight of the polymer B. The storage stability of the ink is satisfied and, in addition, the water resistance of the image is improved only after these configurations are satisfied. The present inventors estimate the reason for improvement in water resistance of the image as described below.

Regarding some recording media for ink-jet, the pH of the surface of the recording medium is low under the influence of an additive, e.g., a sizing agent. In the case where an ink containing carbon black particles bonded to the above-described amino group (-Ph-$(CH_2)_n$—$NH_2$) having the above-described specific structure is applied to the above-described recording medium, the site of —$NH_2$ in the amino group is charged to become a cation easily. On the other hand, regarding the site of covalent bond of —NH in the functional group (-Ph-$(CH_2)_n$—NH—R) containing the polymer A and the polymer A, the pH of the recording medium surface is low and, thereby, when an ink is applied to the recording medium, a hydrogen atom bonded to a nitrogen atom is polarized to $\delta^+$ easily. That is, it can be said that the surfaces of the above-described carbon black particles are positively charged on the recording medium surface. On the other hand, the polymer B added to the ink has an anionic group. Therefore, in the case where the surfaces of the carbon black particles come into the state of being positively charged, as described above, an ionic interaction is effected, and the polymer B approaches the surfaces of the carbon black particles to bind between the carbon black particles. Furthermore, in the case where the acid value of the polymer A is specified to be larger than the acid value of the polymer B, redissolution of the polymer B binding between the carbon black particles does not easily occur. Moreover, in the case where the weight average molecular weight of the polymer A is specified to be larger than the weight average molecular weight of the polymer B, the polymer B having a weight average molecular weight smaller than that of the polymer A approaches the surfaces of the carbon black particles easily. It is believed that the water resistance of the image was especially improved as a result of them.

Ink

Components constituting the ink according to aspects of the present invention will be described below in detail.

Carbon Black

The ink according to aspects of the present invention contains carbon black having a DBP oil absorption of 75 ml/100 g or less and a specific surface area of 200 $m^2/g$ or more. According to the examination of the present inventors, in the case where the DBP oil absorption is 75 ml/100 g or less, the degree of fusion between the carbon black particles is lowered, the carbon black particles are deposited more densely and, as a result, the glossiness of the image is improved. Therefore, if the DBP oil absorption exceeds 75 ml/100 g, the glossiness of the image is not obtained. The DBP oil absorption is preferably 40 ml/100 g or more. If the DBP oil absorption of the carbon black is less than 40 ml/100 g, dispersion of carbon black is slightly difficult in some cases, so that the storage stability of the ink may not be obtained sufficiently.

According to the examination of the present inventors, in the case where the specific surface area of the carbon black is 200 $m^2/g$ or more, the primary particle diameter thereof is small sufficiently, the carbon black particles are deposited densely and, as a result, the glossiness of the image is improved. Therefore, if the specific surface area of the carbon black is less than 200 $m^2/g$, high glossiness of the image is not obtained. On the other hand, the specific surface area of the carbon black is preferably 300 $m^2/g$ or less. If the specific surface area of the carbon black exceeds 300 $m^2/g$, the primary particle diameter thereof becomes too small and, thereby, dispersion of the carbon black is slightly difficult in some cases, so that the storage stability of the ink may not be obtained sufficiently. The content (percent by mass) of the carbon black having the above-described characteristics in the ink is preferably 0.1 percent by mass or more and 3.0 percent by mass or less with respect to the total mass of the ink.

Examples of carbon black having characteristics, that is, the DBP oil absorption of 75 ml/100 g or less and the specific surface area of 200 $m^2/g$ or more, used in aspects of the present invention, can include furnace black, lamp black, acetylene black, and channel black. Specifically, commercially available carbon black, as described below, can be used. Examples thereof include Raven 1500 (produced by Columbian Chemicals Company), Monarch: 800, 900, and 1100 (these items are produced by Cabot Corporation), Printex: 85, 95 (these items are produced by Degussa), and No. +900, No. 1000, No. 2200B, No. 2300, No. 2350, No. 2400R, and MCF-88 (these items are produced by MITSUBISHI CHEMICAL CORPORATION). As a matter of course, carbon black newly produced for aspects of the present invention can also be used.

Ascertainment of specific surface area and DBP oil absorption of carbon black

According to aspects of the present invention, the specific surface area and the DBP oil absorption of the carbon black can be ascertained by a technique accompanied with simple separation of carbon black in the ink, as described below. In this regard, the specific surface area refers to a value indicating the surface area per unit mass of carbon black particle. Furthermore, the DBP oil absorption refers to a value indicating the bulkiness and the structure of carbon black particles, and as this value becomes large, the particles become bulky.

The explanation will be made below with reference to a method for analyzing the ink containing the polymer B and the carbon black bonded to the functional group containing the polymer A. Initially, at the first stage, the carbon black to be ascertained and water-soluble components contained in the ink are separated. Subsequently, at the second stage, the dispersion system of the carbon black contained in the precipitates obtained at the first stage is ascertained. In addition, at the third stage, the polymer component bonded to the surface of the carbon black particle is separated, and regarding the carbon black, which is the precipitate, the specific surface area and the DBP oil absorption are measured. In the case where other polymers, e.g., a polymer emulsion, is contained besides the polymer A and the polymer B, the analysis may be performed while a method for separating the other polymers at a suitable stage is incorporated appropriately.

More specifically, for example, the following condition and method can be used. Initially, 20 g of ink containing the carbon black is taken and is adjusted in such a way that the content of the total solids becomes about 10 percent by mass, and centrifugal separation is performed with a centrifugal separator under the condition of 12,000 rpm and 60 minutes (first stage). Subsequently, a liquid layer containing water-soluble components, e.g., a water-soluble organic solvent and a water-soluble polymer, and a lower layer (precipitates) are separated. Regarding the above-described precipitates, Soxhlet extraction is performed by using an organic solvent, e.g., tetrahydrofuran, (second stage). In the Soxhlet extraction, precipitation with an acid can be performed, as necessary. Furthermore, the type of organic solvent may be changed appropriately. Then, the solid layer obtained by the Soxhlet extraction is subjected to thermogravimetric analysis (TGA). Then, in the case where a weight reduction is observed in the side of the temperature (100° C. to 200° C.) lower than the decomposition temperature of the carbon black of about 800° C., it is assumed that decomposition of the polymer have occurred, and it is assumed that the carbon black bonded to the functional group containing the polymer is contained. On the other hand, in the case where no weight reduction is observed in the low temperature side, it is assumed that the carbon black is not bonded to the functional group containing the polymer. In the case where it is determined that the carbon black bonded to the functional group containing the polymer is contained, the treatment at the third stage is performed, as described below. Regarding the solid layer after being subjected to the Soxhlet extraction, bonding portion of the surface of the carbon black particle and the polymer is hydrolyzed with an alkali, e.g., a 10% potassium hydroxide aqueous solution. Thereafter, putting into a solvent, e.g., toluene or acetone, which can dissolve the polymer, is performed. Consequently, the polymer bonded to the surface of the carbon black particle comes into the state of being dissolved in a liquid layer, and the carbon black comes into the state of being precipitated. The carbon black separated by the above-described method is taken out, is dried and, thereafter, is served as a sample for measuring the specific surface area and the DBP oil absorption.

The carbon black obtained by the above-described three stages of treatment is merely the carbon black, from which the polymer adsorbed by and bonded to itself has been removed, and therefore, has the same characteristics as those of the carbon black present in the ink before the centrifugal separation. The specific surface area can be determined through measurement on the basis of Nitrogen adsorption specific surface area ($N_2SA$) ($m^2/g$): ASTM D-3037 (30733) Method C. The DBP oil absorption can be determined through measurement on the basis of DBP (dibuthylphthalate) oil absorption (mL/100 g): ASTM D-2414 Method. In this regard, the liquid layers taken through separation at the above-described first and third stages contain the polymer B and the polymer A, respectively. These polymers are analyzed and, thereby, the properties thereof and the type of the polymer bonded to the surface of the carbon black particle can be known. The method therefor will be described later.

Functional Group

Regarding the carbon black constituting the ink according to aspects of the present invention, each of -Ph-$(CH_2)_n$—$NH_2$ and -Ph-$(CH_2)_n$—NH—R serving as a functional group is bonded to the surface of carbon black particle. In these formulae, Ph represents a phenylene group, n represents an integer of 0 to 2, and R represents the polymer A. In this regard, in the case where n represents 0, —$NH_2$ or —NH—R is directly bonded to a phenylene group. Furthermore, the -Ph-$(CH_2)_n$—NH—R group is a functional group formed by bonding of the polymer A, as described later, to a terminal of the structure of -Ph-$(CH_2)_n$—NH—. According to aspects of the present invention, when the position bonding to the surface of carbon black particle is assumed to be position 1, -Ph-$(CH_2)_n$—$NH_2$ or -Ph-$(CH_2)_n$—NH—R can be bonded to the meta position or para position of the phenylene group. Moreover, it is preferable that -Ph-$(CH_2)_n$— in the above-described two types of functional groups have the same structure.

The total density (functional group density) of the -Ph-$(CH_2)_n$—$NH_2$ group and the -Ph-$(CH_2)_n$—NH—R group bonded to the surface of the carbon black particle is preferably 0.5 µmol/$m^2$ or more and 3.0 µmol/$m^2$ or less. In this regard, the unit of the functional group density indicates the number of moles of functional group per unit area of carbon black. According to aspects of the present invention, the density of the -Ph-$(CH_2)_n$—NH—R group can be higher than the density of the -Ph-$(CH_2)_n$—$NH_2$ group. Furthermore, it is preferable that density of -Ph-$(CH_2)_n$—$NH_2$ is 0.20 times or more and 0.45 times or less of the above-described functional group density on a molar ratio basis.

Regarding these functional groups, —$NH_2$ is charged to become a cation easily, and a hydrogen atom bonded to a nitrogen atom in —NH—R is polarized easily, so that the polymer B (polymer B concerned will be described later) in the ink approaches the surfaces of the carbon black particles easily. Consequently, the polymer B can bind between a plurality of carbon black particles, so that the water resistance of the image can be improved. However, according to the examination of the present inventors, in the case where an alkylene group having the carbon number of 3 or more is interposed between the phenylene group of the -Ph-$(CH_2)_n$—NH—R group and —NH, —NH—R(R represents the polymer A described later) come apart from the surfaces of the carbon black particles. Consequently, it becomes difficult to bind between the carbon black particles with the polymer B efficiently in this case, and the water resistance of the image is not obtained.

Examples of methods for introducing the above-described functional group specified in aspects of the present invention to the surface of the carbon black particle include a method, in which a diazonium salt is generated from an aromatic compound having two amino groups (one of them may be an alkylamino group), and this is reacted with the particle surface. According to the above-described method, carbon black can be obtained, in which a functional group composed of an amino group and a phenylene group bonded directly or with a methylene group or an ethylene group therebetween is bonded to the particle surface. A reaction to further add the polymer A described later to the thus bonded -Ph-$(CH_2)_n$—$NH_2$ group is effected and, thereby, carbon black in which the -Ph-$(CH_2)_n$—NH—R group (R represents the polymer A) is bonded to the particle surface can be obtained. For details, the -Ph-$(CH_2)_n$—$NH_2$ group can be bonded to the polymer A by an amide bond formed through dehydration-condensation of the terminal of the -Ph-$(CH_2)_n$—$NH_2$ group and a carboxyl group at the terminal of the polymer A. As a matter of course, the method is not limited to this manufacturing method insofar as the requirements according to aspects of the present invention are satisfied.

Polymer

The polymer A is contained in the functional group bonded to the surface of the carbon black particle (R in the -Ph-$(CH_2)_n$—NH—R group), as described above, and in addition, it is necessary to satisfy the following requirements. That is, the polymer A is required to have an acid value of 200 mgKOH/g or more and 300 mgKOH/g or less and a weight average molecular weight larger than that of the polymer B described later. If the acid value of the polymer A is less than 200 mgKOH/g, a part of anionic groups in the polymer A are lost because of bonding of the polymer A and the functional group. Consequently, the electrostatic repulsion resulting from the above-described anionic group is reduced and, thereby, the dispersion stability of the carbon black is degraded. As a result, the storage stability of the ink is not obtained. On the other hand, if the acid value of the polymer A exceeds 300 mgKOH/g, the anionic group in the polymer A increases and, thereby, the water resistance of the resulting image is not obtained. The weight average molecular weight of the polymer A is preferably 15,500 or more and 20,000 or less. If it is intended to satisfy the above-described acid value in the case where the weight average molecular weight of the polymer A is less than 15,500, the anionic groups in the polymer is relatively reduced and, thereby, the dispersion stability of the carbon black is degraded, and the storage stability of the ink is not obtained in some cases. On the other hand, if the weight average molecular weight of the polymer A exceeds 20,000, the viscosity of the ink increases easily, and the dispersion state of the carbon black becomes unstable easily, so that the storage stability of the ink is not obtained sufficiently in some cases.

The polymer B is used as a polymer dispersing agent to be added to the ink, and it is necessary that the acid value is 80 mgKOH/g or more and 180 mgKOH/g or less, and the weight average molecular weight is smaller than that of the above-described polymer A. If the acid value of the polymer B is less than 80 mgKOH/g, the hydrophilicity is low, the polymer B precipitates easily in long-term storage of the ink, the particle diameter of the pigment increases easily, and the storage stability of the ink is not obtained. On the other hand, if the acid value of the polymer B exceeds 180 mgKOH/g, the hydrophilicity is high, the polymer permeates into the recording medium together with an aqueous medium in the ink easily. Consequently, it becomes difficult to bind between a plurality of carbon black particles with the polymer B, and the water resistance of the image is not obtained. The weight average molecular weight of the polymer B is preferably 5,000 or more and 14,500 or less. If the weight average molecular weight of the polymer B is less than 5,000, the film forming property of the polymer B is degraded, and the water resistance of the resulting image is not obtained sufficiently in some cases. On the other hand, if the weight average molecular weight of the polymer B exceeds 14,500, agglomeration of the polymer B proceeds excessively on the surface of the recording medium, the image surface does not become smooth sufficiently, and the glossiness of the image is not obtained sufficiently in some cases.

According to aspects of the present invention, it is necessary that the weight average molecular weight of the polymer A is larger than the weight average molecular weight of the polymer B. In the case where the weight average molecular weights of the polymer A and the polymer B are specified to satisfy the above-described relationship, the influence of steric hindrance of the polymer A is reduced, the polymer B approaches the surfaces of the carbon black particles easily, and the polymer B binds between a plurality of carbon black particles, so that the water resistance of the resulting image can be improved. Meanwhile, according to the examination of the present inventors, in the case where the weight average molecular weights of the polymer A and the polymer B are the same or the polymer A has a weight average molecular weight smaller than that of the polymer B, the water resistance of the image is not obtained. Furthermore, as for each of the polymer A and the polymer B, a polymer having a polydispersity Mw/Mn (Mw represents a weight average molecular weight and Mn represents a number average molecular weight) of 3 or less can be used.

According to aspects of the present invention, the contents of the polymer A and the polymer B in the ink are preferably within the following ranges. That is, each of the contents (percent by mass) of the polymer A and the polymer B in the ink is preferably 0.1 percent by mass or more and 5.0 percent by mass or less with respect to the total mass of the ink. In this regard, although the polymer A is bonded to the carbon black, according to aspects of the present invention, the content of the polymer itself is referred to as the "content of polymer A". Furthermore, it is preferable that the total of the content (percent by mass) of the polymer A with respect to the total mass of the ink and the content (percent by mass) of the polymer B with respect to the total mass of the ink is 0.8 percent by mass or more and 4.7 percent by mass or less. If the total of the content (percent by mass) of the polymer A and the content (percent by mass) of the polymer B (hereafter may be referred to as the total of polymer contents) is less than 0.8 with respect to the total mass of the ink, the amount of polymers binding between the carbon black particles is insufficient and the water resistance is not obtained sufficiently in some cases. On the other hand, if the total of polymer contents exceeds 4.7 percent by mass, the polymers are excessively present on the surface of the recording medium, so that the smoothness of the image surface is impaired and the glossiness of the image is not obtained sufficiently in some cases.

Moreover, the mass ratio of the total of polymer contents (percent by mass) to the content (percent by mass) of the carbon black is preferably 0.7 times or more and 11.0 times or less. That is, it is preferable that total of polymer contents/content of carbon black=0.7 or more and 11.0 or less. If the above-described mass ratio is less than 0.7 times, the dispersion state of the carbon black becomes unstable easily, so that the storage stability of the ink is not obtained sufficiently in some cases. On the other hand, if the above-described ratio exceeds 11.0 times, the viscosity of the ink increases easily, and the dispersion state of the carbon black becomes unstable easily, so that the storage stability of the ink is not obtained sufficiently in some cases. Furthermore, from the viewpoint of further improving the dispersion stability of the carbon black and satisfying the storage stability of the ink at a high level, it is preferable that the ratio of the polymer A to the carbon black is specified as described below. It is preferable that the mass ratio of the polymer A bonded to the carbon black to the carbon black is 0.3 times or more, that is, content of polymer A/content of carbon black=0.3 or more. In this regard, the above-described mass ratio can be determined through each amount of the polymer and the carbon black obtained by the hydrolysis at the third stage described later.

As for each of the polymer A and the polymer B constituting the ink according to aspects of the present invention, a plurality of types of polymers may be used insofar as the acid value and the weight average molecular weight satisfy the above-described ranges. Furthermore, insofar as the polymer A and the polymer B are used, polymers other than them can be used in combination within the bounds of not impairing the effects according to aspects of the present invention. However, in order to obtain the effects according to aspects of the present invention efficiently, the proportion of the total content of the polymer A and the polymer B, constituting the total content of polymers in the ink, is preferably 90.0 percent by mass or more, and furthermore 95.0 percent by mass or more. In particular, all polymers contained in the ink can satisfy the requirements for the above-described polymer A or polymer B. In one aspect of the present invention, the polymer A and the polymer B can be water-soluble polymers having no particle diameter when being neutralized with an alkali equivalent to the acid values.

As for units constituting each of the polymer A and the polymer B contained in the ink according to aspects of the present invention, any polymer can be used insofar as the polymer has the acid value and the weight average molecular weight within the above-described range and has a necessary number of anionic units to adjust the acid value. Specifically, the polymer can be a copolymer having a hydrophobic unit and a hydrophilic unit selected from the respective groups described below. In the following description, a term "(meth) acryl" represents acryl and methacryl and a term "(meth) acrylate" represents acrylate and methacrylate.

Examples of monomers, which become hydrophobic units constituting the polymer through polymerization, include hydrophobic monomers, such as, monomers having an aromatic group, e.g., styrene, α-methyl styrene, and benzyl (meth)acrylate; and (meth)acrylic acid alkyl ester based monomers, e.g., methyl (meth)acrylate, ethyl (meth)acrylate, n-butyl (meth)acrylate, and n-hexyl (meth)acrylate.

Examples of monomers, which become hydrophilic units constituting the polymer through polymerization, include anionic monomers having a carboxyl group, e.g., (meth) acrylic acid, crotonic acid, ethacrylic acid, (iso)propyl (meth) acrylic acid, itaconic acid, and fumaric acid; anionic monomers having a sulfonic acid group, e.g., styrene sulfonic acid, sulfonic acid-2-propyl (meth)acrylamide, (meth)acrylic acid-2-ethyl sulfonate, and butyl (meth)acrylamide sulfonic acid; anionic monomers having a phosphonic acid group, e.g., (meth)acrylic acid-2-ethyl phosphonate; nonionic monomers having a hydroxyl group, e.g., 2-hydroxyethyl (meth)acrylate; nonionic monomers, e.g., diethylene glycol mono(meth) acrylate and methoxydiethylene glycol mono(meth)acrylate; vinyl ether based monomers, e.g., 2-hydroxyethylvinyl ether and diethylene glycol monovinyl ether; and monomers having a polysiloxane structure, e.g., a monomer represented by the following formula (1).

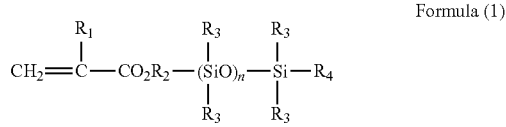

Formula (1)

(In Formula (1), $R_1$ represents a hydrogen atom or a methyl group, $R_2$ represents an alkylene group having the carbon number of 1 to 6, a plurality of $R_3$ represent independently a methyl group or a phenyl group, $R_4$ represents a phenyl group or an alkyl group having the carbon number of 1 to 6, and n represents an integer of 0 to 150.)

According to aspects of the present invention, each of the polymer A and the polymer B can include at least a unit serving as a hydrophilic unit derived from a (meth)acrylic acid. Furthermore, each of the polymer A and the polymer B can include at least a unit serving as a hydrophobic unit derived from a styrene because the water resistance of the image can be obtained at a high level. Moreover, the polymer A and the polymer B can include at least a common unit because excellent compatibility of polymers with each other is exhibited and the glossiness of the image and the storage stability of the ink can be achieved at a high level.

Ascertainment of acid value and weight average molecular weight of polymer and determination whether polymer A is bonded to carbon black.

According to aspects of the present invention, ascertainment of the acid value and the weight average molecular weight of the polymer and determination whether the polymer A is bonded to the carbon black are performed by the following method taking advantage of the above-described technique to analyze the carbon black in the ink. In this regard, the specific technique of the three stages of treatment may be performed as described above.

Initially, at the first stage, the carbon black (precipitates) to be ascertained and water-soluble components (liquid layer) contained in the ink are separated. The polymer B is contained in the resulting liquid layer. Therefore, the acid value and the weight average molecular weight of the polymer B contained in the ink can be measured by analyzing polymers in the liquid layer. Determination whether the polymer A is bonded to the carbon black is performed at the second stage, and in the case where bonding is observed, the treatment at the third stage is performed. The polymer A bonded to the surface of the carbon black particle is separated through hydrolysis at the third stage, and the state in which the polymer A is dissolved in solvent is brought about. Consequently, the acid value and the weight average molecular weight of the polymer A contained in the ink can be measured by analyzing the polymers in the resulting solution. In this regard, the acid value of each polymer can be measured on the basis of JIS K0070, and the weight average molecular weight can be measured as described below.

The weight average molecular weight of the polymer can be measured by gel permeation chromatography (GPC) through the use of tetrahydrofuran as a mobile phase. In the examples described later, the following measuring method is used. The measurement conditions, e.g., a filter, a column, a standard polystyrene sample, and the molecular weight thereof, according to aspects of the present invention are not limited to those described below.

Initially, a solution is prepared by putting a sample to be measured into tetrahydrofuran, followed by standing for several hours to dissolve. Thereafter, the above-described solution is filtrated with a solvent-resistant membrane filter having a pore size of 0.45 µm (for example, trade name: TITAN2 Syringe Filter, PTFE, 0.45 µm; produced by SUN-SRi), so as to prepare a sample solution. The sample solution is prepared in such a way that the polymer content becomes 0.1 percent by mass or more and 0.5 percent by mass or less. As for GPC, a refractive index (RI) detector is used. In order to measure the molecular weight within the range of $10^3$ to $2 \times 10^6$ accurately, a plurality of commercially available polystyrene gel columns can be combined. For example, four units of Shodex KF-806M (produced by SHOWA DENKO K.K.) in combination or an equivalent thereof can be used. Tetrahydrofuran serving as a moving phase is passed at a flow rate of 1 mL/min through the column stabilized in a heat chamber at 40.0° C., and about 0.1 mL of the above-described sample solution is injected. The weight average molecular weight of the sample is determined by using a molecular weight calibration curve formed on the basis of the standard polystyrene samples. It is appropriate that the standard polystyrene sample having a molecular weight of about $10^2$ to $10^7$ (for example, produced by Polymer Laboratories) is used and at least 10 types of standard polystyrene samples are used.

Polyethylene Glycol

The water resistance of the image can be more improved by further containing polyethylene glycol having an average molecular weight of 600 or more and 2,000 or less into the ink according to aspects of the present invention. As for the reason the above-described effects are obtained, the present inventors estimate as described below. In the case where the ink is applied to the recording medium and the concentration of the above-described polyethylene glycol is increased relatively by evaporation of water and the like, the polyethylene glycol performs functions of making the dispersion state of the specific carbon black constituting the ink according to aspects of the present invention unstable and facilitating agglomeration. Consequently, on the surface of the recording medium, a function of assisting the polymer B in binding between a plurality of carbon black particles is performed and, as a result, the water resistance of the image can be more improved. Meanwhile, if the average molecular weight of polyethylene glycol contained is less than 600, the function of facilitating agglomeration of the carbon black is degraded and the effect of more improving the water resistance of the image is not obtained in some cases. If the average molecular weight of contained polyethylene glycol exceeds 2,000, the effect of more improving the water resistance of the image is obtained, but the solubility of polyethylene glycol in the ink is reduced, so that the storage stability is not obtained sufficiently in some cases.

According to aspects of the present invention, in the case where polyethylene glycol having an average molecular weight of 600 or more and 2,000 or less is contained in the ink, the content (percent by mass) thereof in the ink is preferably 1.0 percent by mass or more and 5.0 percent by mass or less with respect to the total mass of the ink.

The value of average molecular weight of polyethylene glycol according to aspects of the present invention includes the range from the value minus 30 to the value plus 30. For example, in the case where the average molecular weight of polyethylene glycol is 1,000, the average molecular weight within the range of 970 to 1,030 is represented by the average molecular weight of 1,000. In more detail, polyethylene glycol having an average molecular weight determined by the measuring method described below of 970 to 1,030 is assumed to be polyethylene glycol having an average molecular weight of 1,000.

The average molecular weight of polyethylene glycol used according to aspects of the present invention is the value measured as described below. After 1 g (weighed to 0.1 mg) of polyethylene glycol sample to be measured is put into 25 mL of pyridine solution of phthalic anhydride accurately weighed by a flask with ground-in stopper, the ground-in stopper is set. Heating is performed in a boiled water bath for 2 hours, followed by standing until room temperature is reached. Subsequently, 50 mL (weighed accurately) of 0.5 mol/L of sodium hydroxide aqueous solution and 10 drops of phenolphthalein titrant are put into the resulting flask. The liquid in the flask is titrated by using 0.5 mol/L of sodium hydroxide aqueous solution, and the point at which the liquid keeps red for 15 seconds is assumed to be an end point. The average molecular weight is calculated on the basis of the following formula from the thus obtained amount of titration M (mL) of the present test and the amount of titration R (mL) obtained by a blank test performed as in the above-described manner except that the polyethylene glycol sample is not used.

$$\text{average molecular weight} = \frac{\text{amount of sampling of polyethylene glycol(g)} \times 4000}{(\text{amount of titration of the present test } M \text{ (mL)} - \text{amount of titration of blank test } R \text{ (mL)}) \times 0.5 \text{ (mol/L)}}$$

Aqueous Medium

The ink according to aspects of the present invention can contain an aqueous medium which is a mixed solvent composed of water and an water-soluble organic solvent. As for the water-soluble organic solvent, any one of solvents previously used for ink-jet ink, for example, monohydric and polyhydric alcohols, glycols, glycol ethers, and heterocyclic compounds, can be used. The content (percent by mass) of the water-soluble organic solvent in the ink is preferably 2.0 percent by mass or more and 50.0 percent by mass or less with respect to the total mass of the ink. In this regard, the content of the water-soluble organic solvent in this case is a value including the content of the above-described polyethylene glycol having an average molecular weight of 600 or more and 2,000 or less. The content (percent by mass) of water in the ink is preferably 50.0 percent by mass or more and 95.0 percent by mass or less with respect to the total mass of the ink.

Other Components

The ink according to aspects of the present invention may contain water-soluble organic compounds, e.g., urea, urea derivatives, trimethylol propane, and trimethylol ethane, which are solid at room temperature, besides the above-described components. The content (percent by mass) of the water-soluble organic compounds, which are solid at room temperature, in the ink is preferably 0.1 percent by mass or more and 20.0 percent by mass or less, and more preferably 3.0 percent by mass or more and 10.0 percent by mass or less with respect to the total mass of the ink. Furthermore, as necessary, the ink according to aspects of the present invention may contain various additives, e.g., a pH regulator, a rust inhibitor, a fungicide, an antioxidant, and a reduction inhibitor, besides the above-described components.

Ink-Jet Recording Method

An ink-jet recording method according to aspects of the present invention includes the step of applying an ink to a recording medium by ejecting the above-described ink according to aspects of the present invention from an ink-jet recording head. As for the ink-jet system, there is a system in which ink is ejected by applying thermal energy or mechanical energy to the ink. Regarding aspects of the present invention, in particular, the recoding method by using the thermal energy can be employed because more remarkable effects can be obtained and it is preferable to use a recording medium having pH of its surface of about 4 to 10 as the recording medium. Known steps may be employed as the steps of the ink-jet recording method except that the ink according to aspects of the present invention is used.

Ink Cartridge

The ink cartridge according to aspects of the present invention includes an ink storage portion to store an ink, wherein the ink having the above-described configuration, according to aspects of the present invention, is stored in the above-described ink storage portion. As for the structure of the ink cartridge, a structure in which the ink storage portion is formed from an ink holding chamber to store the ink in a space in the inside thereof and a negative pressure generating member holding chamber to store a negative pressure generating member to hold the ink in the inside thereof through the use of a negative pressure generated by an absorber or the like is mentioned. Alternatively, the ink cartridge may include an ink storage portion which does not have the ink holding chamber to store the ink in a space in the inside thereof, but which is configured to hold the whole ink to be stored by the negative pressure generating member. Furthermore, a bag-shaped ink storage portion, which stores the ink by being provided with a force in the direction to expand the internal volume thereof with a spring member or the like, may be employed. A form in which the ink cartridge having these configurations is further integrated with a recording head may be employed.

EXAMPLES

Aspects of the present invention will be described below in further detail with reference to examples and comparative examples. However, the present invention is not limited to the following examples within the bounds of not departing from the gist thereof. By the way, in the following description, the terms "part" and "%" are on a mass basis, unless otherwise specified.

Introduction of Functional Group on Surface of Carbon Black Particle

A solution in which 7.5 mmol of each amine compound shown in Table 1 was dissolved into 30 g of water was mixed with 1.2 g of silver nitrate under agitation. Resulting precipitates were removed through filtration to obtain a filtrate. The filtrate obtained as described above was added to a suspension in which 10 g of carbon black having the characteristics shown in Table 1 described below was dispersed in 70 g of water. The resulting mixture was mixed with 1.6 g of concentrated hydrochloric acid and a solution in which 0.60 g of sodium nitrite was dissolved into 10 g of water was added. After generation of bubbles of nitrogen gas associated with a reaction of a diazonium salt, which is converted from an amino group directly bonded to a benzene ring, with carbon black is stopped, drying was performed in an oven at a temperature of 120° C. As described above, Pigments 1 to 9 in which a functional group containing the amino group was bonded to the surface of carbon black particle were obtained. Furthermore, in Table 1 described below, values of the functional group density of particle surface of Pigments 1 to 9 which were determined from the measurement of counter ions amount were also shown. The counter ions amount were measured by using Ionic Chromatography (trade name; Dionex DX-320, produced by Dionex Co., Ltd.).

TABLE 1

Each component used for synthesis of pigment

| | | Characteristic of carbon black | | |
|---|---|---|---|---|
| | Amine compound | Specific surface area [m²/g] | DBP oil absorption [mL/100 g] | Functional group density [μmol/m²] |
| Pigment 1 | 3-aminobenzylamine | 240 | 65 | 1.5 |
| Pigment 2 | 3-aminobenzylamine | 240 | 75 | 1.5 |
| Pigment 3 | 3-aminobenzylamine | 240 | 120 | 1.5 |
| Pigment 4 | 3-aminobenzylamine | 200 | 65 | 1.8 |
| Pigment 5 | 3-aminobenzylamine | 80 | 65 | 2.2 |
| Pigment 6 | 3-(2-aminoethyl)aniline | 240 | 65 | 1.5 |
| Pigment 7 | 1,3-benzenediamine | 240 | 65 | 1.5 |
| Pigment 8 | 3-(2-aminobutyl)aniline | 240 | 65 | 1.5 |
| Pigment 9 | 3-aminobenzylamine | 220 | 112 | 1.6 |

Preparation of Polymer Aqueous Solution

Each polymer having a composition (mass) ratio of constitution unit, a weight average molecular weight, and an acid value shown in Table 2 described below was synthesized by the usual method. Subsequently, sodium hydroxide equivalent to the acid value of each polymer and water were added, and agitation was performed at a temperature of 80° C., so as to obtain Polymer aqueous solutions 1 to 21 having a polymer solid content of 20.0%. Regarding abbreviations of monomer units in Table 2, St represents styrene, α-MSt represents α-methylstyrene, BzMA represents benzyl methacrylate, and AA represents acrylic acid.

TABLE 2

Characteristics of polymer in polymer aqueous solution

| | Weight average molecular weight | Acid value [mgKOH/g] | Composition (mass) ratio of constitution unit | | | |
|---|---|---|---|---|---|---|
| | | | St | α-MSt | BzMA | AA |
| Polymer aqueous solution 1 | 4,000 | 240 | 60 | 9 | | 31 |
| Polymer aqueous solution 2 | 14,500 | 240 | 60 | 9 | | 31 |
| Polymer aqueous solution 3 | 15,500 | 240 | 60 | 9 | | 31 |
| Polymer aqueous solution 4 | 16,500 | 240 | 60 | 9 | | 31 |
| Polymer aqueous solution 5 | 20,000 | 240 | 60 | 9 | | 31 |
| Polymer aqueous solution 6 | 21,000 | 240 | 60 | 9 | | 31 |
| Polymer aqueous solution 7 | 14,500 | 190 | 66 | 10 | | 24 |
| Polymer aqueous solution 8 | 14,500 | 200 | 65 | 10 | | 25 |
| Polymer aqueous solution 9 | 14,500 | 300 | 53 | 8 | | 39 |
| Polymer aqueous solution 10 | 14,500 | 320 | 51 | 8 | | 41 |
| Polymer aqueous solution 11 | 4,000 | 160 | 69 | 10 | | 21 |
| Polymer aqueous solution 12 | 5,000 | 160 | 69 | 10 | | 21 |
| Polymer aqueous solution 13 | 8,000 | 160 | 69 | 10 | | 21 |
| Polymer aqueous solution 14 | 14,500 | 160 | 69 | 10 | | 21 |
| Polymer aqueous solution 15 | 15,500 | 160 | 69 | 10 | | 21 |
| Polymer aqueous solution 16 | 4,000 | 70 | 79 | 12 | | 9 |
| Polymer aqueous solution 17 | 4,000 | 80 | 78 | 12 | | 10 |
| Polymer aqueous solution 18 | 4,000 | 180 | 67 | 10 | | 23 |
| Polymer aqueous solution 19 | 4,000 | 190 | 66 | 10 | | 24 |
| Polymer aqueous solution 20 | 14,500 | 240 | | | 69 | 31 |
| Polymer aqueous solution 21 | 4,000 | 160 | | | 79 | 21 |

Preparation of Pigment Dispersion

Pigment Dispersions 1 to 16, 18, 20, 21

Each pigment dispersion having a composition shown in Table 3 described below was prepared by the following method. A dispersion, in which 50 g of each carbon black shown in Table 3 was dispersed in 1,450 g of ion-exchanged water, was added to 1,000 g of each polymer aqueous solution (polymer solid content 20.0%) obtained as described above under agitation. The resulting mixture was transferred to a Pyrex (registered trade mark) evaporating dish, and liquid components were evaporated by performing heating at a temperature of 150° C. for 15 hours, followed by cooling to room temperature, so as to obtain an evaporation-drying product. Subsequently, the resulting evaporation-drying product was added to and dispersed in distilled water exhibiting pH of 9.0, which was adjusted with sodium hydroxide, and 1.0 mol/L sodium hydroxide aqueous solution was further added under agitation to adjust the pH of the liquid to 10 to 11. In this manner, a part of amino groups contained in the functional groups bonded to the surface of the carbon black particle and carboxyl groups of the polymer were subjected to dehydration-condensation. Thereafter, desalting, refining to remove impurities, and removal of coarse particles were performed, so as to prepare each Pigment dispersion having a carbon black content of 10.0% and a polymer content of 4.0%. The resulting each Pigment dispersion was subjected to thermal analysis and, thereby, it was ascertained that the functional group containing the amino group having the structure specified according to aspects of the present invention and the functional group containing the polymer A were bonded to the surface of the carbon black particle.

Pigment Dispersion 17

Pigment dispersion 17 containing carbon black, in which each of -Ph-$(CH_2)_n$—$NH_2$ and —R serving as a functional group was bonded to the surface of the carbon black particle, was prepared with reference to the description in Japanese Patent Laid-Open No. 2000-095987. In the above-described formulae, Ph represents a phenylene group, n represents 1, and R represents a polymer described later. The carbon black content of Pigment dispersion 17 was 10.0%, and the polymer content was 4.0%. The specific surface area of the carbon black was 240 $m^2$/g, and the DBP oil absorption was 65 mL/100 g. The composition (mass) ratio of the constitution unit of the bonded polymer R was St/α-MSt/AA=60/9/31, the weight average molecular weight was 14,500, and the acid value was 240 mgKOH/g.

Pigment Dispersion 19

After 10 parts by weight of carbon black having a specific surface area of 240 $m^2$/g and a DBP oil absorption of 65 mL/100 g, 20 parts by weight of Polymer aqueous solution 2, and 70 parts by weight of ion-exchanged water were mixed, dispersion was performed with a batch vertical type sand mill for 3 hours. Subsequently, pressure filtration was performed with a microfilter (produced by FUJIFILM Corporation) having a pore size of 3.0 μm, water was added and, thereby, Pigment dispersion 19 having a carbon black content of 10.0% and a polymer content of 4.0% was prepared.

TABLE 3

Compositions of Pigment dispersions 1 to 16, 18, 20, and 21 (unit: %)

| | Type of Pigment dispersion | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 18 | 20 | 21 |
| Pigment 1 | 10.0 | 10.0 | 10.0 | 10.0 | 10.0 | 10.0 | 10.0 | 10.0 | 10.0 | 10.0 | | | | | | | | 10.0 | |
| Pigment 2 | | | | | | | | | | | 10.0 | | | | | | | | |
| Pigment 3 | | | | | | | | | | | | 10.0 | | | | | | | |
| Pigment 4 | | | | | | | | | | | | | 10.0 | | | | | | |
| Pigment 5 | | | | | | | | | | | | | | 10.0 | | | | | |
| Pigment 6 | | | | | | | | | | | | | | | 10.0 | | | | |
| Pigment 7 | | | | | | | | | | | | | | | | 10.0 | | | |
| Pigment 8 | | | | | | | | | | | | | | | | | 10.0 | | |
| Pigment 9 | | | | | | | | | | | | | | | | | | | 10.0 |
| Polymer 1 | 4.0 | | | | | | | | | | | | | | | | | | |
| Polymer 2 | | 4.0 | | | | | | | | | 4.0 | 4.0 | 4.0 | 4.0 | 4.0 | 4.0 | 4.0 | | 4.0 |
| Polymer 3 | | | 4.0 | | | | | | | | | | | | | | | | |
| Polymer 4 | | | | 4.0 | | | | | | | | | | | | | | | |
| Polymer 5 | | | | | 4.0 | | | | | | | | | | | | | | |
| Polymer 6 | | | | | | 4.0 | | | | | | | | | | | | | |
| Polymer 7 | | | | | | | 4.0 | | | | | | | | | | | | |
| Polymer 8 | | | | | | | | 4.0 | | | | | | | | | | | |
| Polymer 9 | | | | | | | | | 4.0 | | | | | | | | | | |
| Polymer 10 | | | | | | | | | | 4.0 | | | | | | | | | |
| Polymer 20 | | | | | | | | | | | | | | | | | | 4.0 | |
| Ion-exchanged water | 86.0 | 86.0 | 86.0 | 86.0 | 86.0 | 86.0 | 86.0 | 86.0 | 86.0 | 86.0 | 86.0 | 86.0 | 86.0 | 86.0 | 86.0 | 86.0 | 86.0 | 86.0 | 86.0 |

Preparation of Ink

Each component (unit: %) shown in Table 4 described below was mixed and agitated sufficiently. Thereafter, pressure filtration was performed with a polypropylene filter (produced by Pall Corporation) having a pore size of 1.2 μm to prepare each ink. In Table 4 described below, Acetylenol E100 (produced by Kawaken Fine Chemicals Co., Ltd.) is a surfactant, the numerical value following the term "polyethylene glycol" indicates the average molecular weight thereof. Furthermore, in lower columns in Table 4, values of the total (%) of polymer contents ("Total amount of polymer (%)") and the mass ratio (time) of the total of polymer contents/the carbon black content ("Total amount of polymer/amount of CB (time)") in the ink are also shown.

TABLE 4

| Composition of ink | Example | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Pigment dispersion 4 | 5.0 | 5.0 | 5.0 | 5.0 | 5.0 | 5.0 | 20.0 | 3.0 | 20.0 | 3.0 | 15.0 | 3.0 | 15.0 | 3.0 | 15.0 | 15.0 | 15.0 |
| Polymer aqueous solution 11 | | | | | | | | | | | | | | | | | 0.6 |
| Polymer aqueous solution 12 | | | | | | | | | | | | | | | 0.6 | | |
| Polymer aqueous solution 13 | 20.0 | 20.0 | 20.0 | 20.0 | 20.0 | 20.0 | 3.0 | 15.9 | 2.0 | 17.4 | 1.0 | 22.9 | 0.6 | 23.5 | | | |
| Polymer aqueous solution 14 | | | | | | | | | | | | | | | | 0.6 | |
| Glycerin | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Acetylenol E100 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Polyethylene glycol 200 | | | | 2.0 | | | | | | | | | | | | | |
| Polyethylene glycol 600 | | 2.0 | | | | | | | | | | | | | | | |
| Polyethylene glycol 1,000 | 2.0 | | | | | | | | | | | | | | | | |
| Polyethylene glycol 2,000 | | | 2.0 | | | | | | | | | | | | | | |
| Polyethylene glycol 3,000 | | | | | 2.0 | | | | | | | | | | | | |
| Ion-exchanged water | 62.0 | 62.0 | 62.0 | 62.0 | 62.0 | 64.0 | 66.0 | 70.1 | 67.0 | 68.6 | 73.0 | 63.1 | 73.4 | 62.5 | 73.4 | 73.4 | 73.4 |
| Total amount of polymer [%] | 4.2 | 4.2 | 4.2 | 4.2 | 4.2 | 4.2 | 1.4 | 3.3 | 1.2 | 3.6 | 0.8 | 4.7 | 0.7 | 4.8 | 0.7 | 0.7 | 0.7 |
| Total amount of polymer/amount of CB [time] | 8.4 | 8.4 | 8.4 | 8.4 | 8.4 | 8.4 | 0.7 | 11.0 | 0.6 | 12.0 | 0.5 | 15.7 | 0.5 | 16.1 | 0.5 | 0.5 | 0.5 |

| | Example | | | | | | | | | | | | | | | |
|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 |
| Pigment dispersion 2 | | | | 15.0 | | 15.0 | 15.0 | | | | 15.0 | | 15.0 | | | |
| Pigment dispersion 3 | | 15.0 | | | | | | | | | | | | | | |
| Pigment dispersion 4 | 15.0 | | | | | | | | | | | | | | | |
| Pigment dispersion 5 | | | 15.0 | | | | | | | | | | | | | |
| Pigment dispersion 6 | | | | | 15.0 | | | | | | | | | | | |
| Pigment dispersion 8 | | | | | | | | 15.0 | | | | | | | | |
| Pigment dispersion 9 | | | | | | | | | 15.0 | | | | | | | |
| Pigment dispersion 11 | | | | | | | | | | | | | | | | 15.0 |
| Pigment dispersion 13 | | | | | | | | | | | | | | | 15.0 | |
| Pigment dispersion 15 | | | | | | | | | | | | 15.0 | | | | |
| Pigment dispersion 16 | | | | | | | | | | | | | | 15.0 | | |
| Pigment dispersion 20 | | | | | | | | | | 15.0 | | | | | | |
| Polymer aqueous solution 11 | | 0.6 | 0.6 | 0.6 | 0.6 | | | 0.6 | 0.6 | 0.6 | | 0.6 | 0.6 | 0.6 | 0.6 | 0.6 |
| Polymer aqueous solution 15 | 0.6 | | | | | | | | | | | | | | | |
| Polymer aqueous solution 17 | | | | | | 0.6 | | | | | | | | | | |
| Polymer aqueous solution 18 | | | | | | | 0.6 | | | | | | | | | |
| Polymer aqueous solution 21 | | | | | | | | | | | 0.6 | | | | | |
| Glycerin | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Acetylenol E100 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Ion-exchanged water | 73.4 | 73.4 | 73.4 | 73.4 | 73.4 | 73.4 | 73.4 | 73.4 | 73.4 | 73.4 | 73.4 | 73.4 | 73.4 | 73.4 | 73.4 | 73.4 |
| Total amount of polymer [%] | 0.7 | 0.7 | 0.7 | 0.7 | 0.7 | 0.7 | 0.7 | 0.7 | 0.7 | 0.7 | 0.7 | 0.7 | 0.7 | 0.7 | 0.7 | 0.7 |
| Total amount of polymer/amount of CB [time] | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |

| | Comparative example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Pigment dispersion 1 | | | | | | | | | | 15.0 | | |
| Pigment dispersion 2 | | | | | | | | 15.0 | 15.0 | | 15.0 | |
| Pigment dispersion 7 | | | | | | 15.0 | | | | | | |
| Pigment dispersion 10 | | | | | | | 15.0 | | | | | |
| Pigment dispersion 12 | | 15.0 | | | | | | | | | | |
| Pigment dispersion 14 | | | | 15.0 | | | | | | | | |
| Pigment dispersion 17 | | | | 15.0 | | | | | | | | |
| Pigment dispersion 18 | | | | | 15.0 | | | | | | | |
| Pigment dispersion 19 | | | | | | | | | | | | 15.0 |
| Pigment dispersion 21 | | | 15.0 | | | | | | | | | |
| Polymer aqueous solution 11 | | 0.6 | 0.6 | 0.6 | 0.6 | 0.6 | 0.6 | 0.6 | | | 0.6 | 0.6 |
| Polymer aqueous solution 15 | | | | | | | | | | | 0.6 | |
| Polymer aqueous solution 16 | | | | | | | | | 0.6 | | | |
| Polymer aqueous solution 19 | | | | | | | | | | 0.6 | | |
| Glycerin | | 5.0 | 5.0 | 5.0 | 5.0 | 5.0 | 5.0 | 5.0 | 5.0 | 5.0 | 5.0 | 5.0 |
| Diethylene glycol | | 5.0 | 5.0 | 5.0 | 5.0 | 5.0 | 5.0 | 5.0 | 5.0 | 5.0 | 5.0 | 5.0 |
| Acetylenol E100 | | 1.0 | 1.0 | 1.0 | 1.0 | 1.0 | 1.0 | 1.0 | 1.0 | 1.0 | 1.0 | 1.0 |

TABLE 4-continued

| | Composition of ink | | | | | | | | | | | |
|---|---|---|---|---|---|---|---|---|---|---|---|---|
| Ion-exchanged water | 73.4 | 73.4 | 73.4 | 73.4 | 73.4 | 73.4 | 73.4 | 73.4 | 73.4 | 73.4 | 73.4 | 73.4 |
| Total amount of polymer [%] | 0.7 | 0.7 | 0.7 | 0.7 | 0.7 | 0.7 | 0.7 | 0.7 | 0.7 | 0.7 | 0.7 | 0.7 |
| Total amount of polymer/ amount of CB [time] | 0.5 | 0.5 | 0.5 | 0.5 | 0.5 | 0.5 | 0.5 | 0.5 | 0.5 | 0.5 | 0.5 | 0.5 |

Evaluation

Production of Recorded Article

Each ink obtained as described above was filled in an ink cartridge. A solid image with a recording duty of 200% was recorded on a recording medium (Canon photo paper, glossy gold; produced by CANON KABUSHIKI KAISHA) by using an ink-jet recoding apparatus (trade name: BJF900; produced by CANON KABUSHIKI KAISHA) through 8-pass two-way recording. In this regard, the recording duty was assumed to be 100% in the case where an image was recorded under the condition of the resolution of 1,200 dpi× 1,200 dpi and application of four ink droplets having a mass of 4.5 ng per droplet to a unit region of 1/1,200 dpi×1/1,200 dpi.

Evaluation of Glossiness

The recorded article obtained as described above was stood at room temperature for one day. Thereafter, the glossiness (20°-gloss value) in an image region of each recorded article was measured by using a microhazemeter (produced by BYK-Gardner) to evaluate the glossiness. The glossiness evaluation criteria are as described below. The evaluation results are shown in Table 5. According to aspects of the present invention, evaluation was performed on the basis of the following glossiness evaluation criteria, and it was assumed that A to C were acceptable levels and D was an unacceptable level.

A: The 20°-gloss value was 45 or more.
B: The 20°-gloss value was 40 or more and less than 45.
C: The 20°-gloss value was 35 or more and less than 40.
D: The 20°-gloss value was less than 35.

Evaluation of Water Resistance

One droplet of pure water was dropped in the image region of each recorded article obtained as described above. One minute thereafter, Kimwipe S-200 (trade name; produced by Crecia Co., Ltd.) was pushed from above against the region with dropped pure water, followed by standing for 1 minute. Subsequently, Kimwipe was separated slowly in the direction perpendicular to the image. The states of the image region, on which the pure water was dropped, of the recorded article and Kimwipe were checked visually, and the water resistance was evaluated. The evaluation results are shown in Table 5. According to aspects of the present invention, evaluation was performed on the basis of the following water resistance evaluation criteria, and it was assumed that A to E were acceptable levels and F was an unacceptable level.

A: No change in color of the image was observed, and no ink adhered to Kimwipe.
B: No change in color of the image was observed, but a small amount of ink adhered to Kimwipe.
C: Slight change in color of the image was observed, and the ink adhered to Kimwipe slightly.
D: Change in color of the image was observed, and the ink adhered to Kimwipe.
E: Carbon black of the image was peeled slightly.
F: Most of carbon black of the image was peeled.

Evaluation of Storage Stability

Regarding each ink obtained as described above, the particle diameters of carbon black particles in the ink were measured with Nanotrac UPA-EX150 (produced by NIKKISO CO., LTD.), and the results were assumed to be the particle diameters before storage. Furthermore, each ink obtained as described above was put into a polytetrafluoroethylene container and was sealed. Storage was performed in an oven at a temperature of 60° C. for one month, and the temperature was returned to room temperature. Then, the particle diameters of the carbon black particles in the ink were measured, and the results were assumed to be the particle diameters after storage. The rate of change in particle diameter was determined from the thus obtained particle diameters before storage and after storage on the basis of the formula, rate of change in particle diameter=(particle diameter after storage)/(particle diameter before storage). The storage stability of the ink was evaluated on the basis of the obtained results. The evaluation results are shown in Table 5. According to aspects of the present invention, evaluation was performed on the basis of the following storage stability evaluation criteria, and it was assumed that A to C were acceptable levels and D was an unacceptable level.

A: The rate of change in particle diameter was less than 1.1.
B: The rate of change in particle diameter was 1.1 or more and less than 1.2.
C: The rate of change in particle diameter was 1.2 or more and less than 1.3.
D: The rate of change in particle diameter was 1.3 or more.

TABLE 5

| | | Evaluation result | | |
|---|---|---|---|---|
| | | Glossiness | Water resistance | Storage stability |
| Example | 1 | B | A | A |
| | 2 | B | A | A |
| | 3 | B | A | A |
| | 4 | B | B | A |
| | 5 | B | A | B |
| | 6 | B | B | A |
| | 7 | A | C | A |
| | 8 | B | B | A |
| | 9 | A | C | B |
| | 10 | B | B | B |
| | 11 | A | C | B |
| | 12 | B | B | B |
| | 13 | A | D | B |
| | 14 | C | B | B |
| | 15 | A | D | B |
| | 16 | A | D | B |
| | 17 | A | E | B |
| | 18 | B | D | B |
| | 19 | A | E | B |
| | 20 | A | E | B |
| | 21 | A | E | C |
| | 22 | A | E | C |
| | 23 | A | E | C |
| | 24 | A | E | C |
| | 25 | A | E | C |
| | 26 | A | E | C |
| | 27 | A | E | C |
| | 28 | A | E | C |
| | 29 | A | E | C |

TABLE 5-continued

| | | Evaluation result | | |
|---|---|---|---|---|
| | | Glossiness | Water resistance | Storage stability |
| | 30 | A | E | C |
| | 31 | A | E | C |
| | 32 | A | E | C |
| | 33 | A | E | C |
| Comparative example | 1 | D | E | C |
| | 2 | D | E | C |
| | 3 | D | E | C |
| | 4 | A | F | C |
| | 5 | A | F | C |
| | 6 | A | E | D |
| | 7 | A | F | C |
| | 8 | A | E | D |
| | 9 | A | F | C |
| | 10 | A | F | C |
| | 11 | A | F | C |
| | 12 | A | F | D |

The water resistance of Examples 27 and 28 were somewhat inferior to the water resistance of Example 30.

While aspects of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-009598 filed Jan. 20, 2010, which is hereby incorporated by reference herein in its entirety.

What is claimed is:

1. An ink comprising:
a plurality of polymers; and
carbon black,
wherein the plurality of polymers comprise a polymer A having an acid value of 200 mgKOH/g or more and 300 mgKOH/g or less and a polymer B having an acid value of 80 mgKOH/g or more and 180 mgKOH/g or less, and the weight average molecular weight of the polymer A is larger than the weight average molecular weight of the polymer B, and
the carbon black has a DBP oil absorption of 75 mL/100 g or less and a specific surface area of 200 m$^2$/g or more, and each of -Ph-$(CH_2)_n$—$NH_2$ and -Ph-$(CH_2)_n$—NH—R serving as a functional group is bonded to surfaces of carbon black particles, wherein Ph represents a phenylene group, n represents an integer of 0 to 2, and R represents the polymer A.

2. The ink according to claim 1, wherein the weight average molecular weight of the polymer A is 15,500 or more and 20,000 or less.

3. The ink according to claim 1, wherein the weight average molecular weight of the polymer B is 5,000 or more and 14,500 or less.

4. The ink according to claim 1, wherein the total of the content (percent by mass) of the polymer A and the content (percent by mass) of the polymer B is within the range of 0.8 percent by mass or more and 4.7 percent by mass or less with respect to the total mass of the ink.

5. The ink according to claim 1, wherein the mass ratio of the total of the content (percent by mass) of the polymer A and the content (percent by mass) of the polymer B to the content (percent by mass) of the carbon black is within the range of 0.7 times or more and 11.0 times or less with respect to the total mass of the ink.

6. The ink according to claim 1, further comprising polyethylene glycol having an average molecular weight of 600 or more and 2,000 or less.

7. An ink-jet recording method comprising the step of applying an ink to a recording medium by ejecting the ink from an ink-jet recording head to perform recording, wherein the ink according to claim 1 is used.

8. An ink cartridge comprising an ink storage portion to store an ink, wherein the ink according to claim 1 is stored in the ink storage portion.

* * * * *